(12) United States Patent
Ito (10) Patent No.: US 9,131,212 B2
(45) Date of Patent: Sep. 8, 2015

(54) ELECTRO-OPTIC APPARATUS AND ELECTRONIC APPARATUS

(75) Inventor: Akihiko Ito, Tatsuno-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 425 days.

(21) Appl. No.: 13/592,495

(22) Filed: Aug. 23, 2012

(65) Prior Publication Data

US 2013/0050301 A1  Feb. 28, 2013

(30) Foreign Application Priority Data

Aug. 25, 2011 (JP) ................................. 2011-183467

(51) Int. Cl.
| | |
|---|---|
| *H04N 13/04* | (2006.01) |
| *H04N 9/47* | (2006.01) |
| *H04N 5/268* | (2006.01) |
| *G02F 1/1335* | (2006.01) |
| *G09G 5/10* | (2006.01) |
| *G06T 15/00* | (2011.01) |
| *H04N 13/00* | (2006.01) |

(52) U.S. Cl.
CPC ....... *H04N 13/0033* (2013.01); *H04N 13/0438* (2013.01)

(58) Field of Classification Search
CPC ..................... H04N 13/0438; H04N 13/0033
See application file for complete search history.

(56) References Cited

U.S. PATENT DOCUMENTS

| 2010/0225750 | A1  |  9/2010 | Nakahata et al. |
| 2010/0309381 | A1* | 12/2010 | Nakagawa et al. ........... 348/705 |
| 2011/0007140 | A1  |  1/2011 | Nakahata et al. |
| 2011/0074938 | A1* |  3/2011 | Nakahata ........................ 348/56 |
| 2011/0310090 | A1* | 12/2011 | Kim et al. .................... 345/419 |
| 2011/0316989 | A1  | 12/2011 | Imai |
| 2013/0057791 | A1* |  3/2013 | Kitayama et al. ............... 349/15 |
| 2013/0208024 | A1* |  8/2013 | Oda et al. ..................... 345/690 |

FOREIGN PATENT DOCUMENTS

| JP | 2009-025436 | A |  2/2009 |
| JP | 2010-210712 | A |  9/2010 |
| JP | 2011-018993 | A |  1/2011 |
| JP | 2011-075746 | A |  4/2011 |
| JP | 2011-112745 | A |  6/2011 |
| WO | 2010/134409 | A | 11/2010 |

* cited by examiner

*Primary Examiner* — Jeffeery Harold
*Assistant Examiner* — Sean Haiem
(74) *Attorney, Agent, or Firm* — Maschoff Brennan (57) ABSTRACT

Each control period includes a right eye display period and a left eye display period. A driving circuit supplies grayscale potential based on a right eye image to each pixel in each of the three unit periods of the right eye display period, and supplies the grayscale potential based on a left eye image to each pixel in each of the three unit periods of the left eye display period. The driving circuit performs overdriving in two unit periods from the beginning of each display period, sets the polarity of a voltage applied to each pixel in the two unit periods from the beginning of each display period reverse in the right eye display period of the control period and in the right eye display period of the control period.

10 Claims, 9 Drawing Sheets

ELECTRO-OPTIC APPARATUS AND ELECTRONIC APPARATUS

BACKGROUND

1. Technical Field

The present invention relates to a technology which displays a right eye image and a left eye image to which parallax is mutually applied such that an observer perceives a stereoscopic effect.

2. Related Art

A stereoscopic method using a frame sequential method of alternately displaying a right eye image and a left eye image in a time division manner has been proposed from the related art. In a period during which one of the right eye image and the left eye image is changed to the other, the right eye image and the left eye image are mixed, so that it is difficult for an observer to recognize a definite stereoscopic effect when the observer views the image (crosstalk). In order to solve the above-described problem, for example, JP-A-2009-25436 discloses a technology for causing both the right eye shutter and the left eye shutter of stereoscopic eyeglasses to be in a closed state so that an observer does not view an image in the period during which one of the right eye image and the left eye image is changed to the other (that is, in the period during which the right eye image and the left eye image are mixed).

Figure 11:
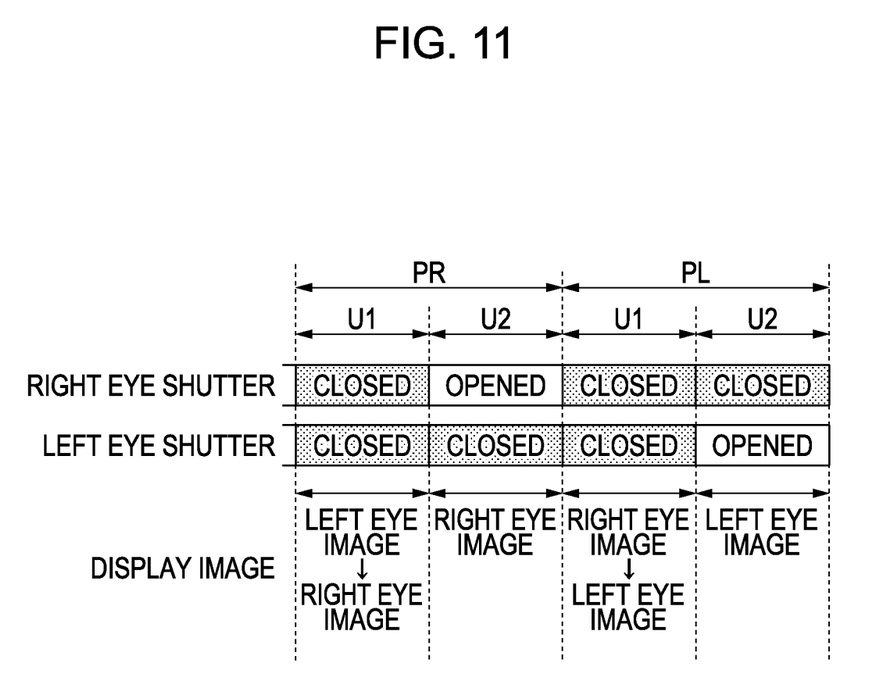
FIG. 11 is an explanatory diagram illustrating a stereoscopic operation according to the related art.

As shown in FIG. 11, the display period PR of the right eye image and the display period PL of the left eye image are alternately set. Each display period P (PR, PL) is divided into a unit period U1 and a unit period U2. The display image is changed from the left eye image to the right eye image in the unit period U1 of the display period PR and the right eye image is displayed in the unit period U2 which is immediately after the unit period U1, so that the display image is changed from the right eye image to the left eye image in the unit period U1 of the display period PL, and the left eye image is displayed in the unit period U2 which is immediately after the unit period U1. In the unit period U1 of each display period P, control is performed such that both the right eye shutter and the left eye shutter are in the closed state. Accordingly, the mixture of the right eye image and the left eye image is not perceived by the observer.

However, in the foundation of the technology disclosed in JP-A-2009-25436, control is performed such that a period during which the observer can actually view an image is about the half (unit period U2) of each display period P. Accordingly, there is a problem in that it is difficult to sufficiently secure the brightness of a display image.

SUMMARY

An advantage of some aspects of the invention is to improve the brightness of a display image while restraining an observer from perceiving the mixture of a right eye image and a left eye image.

According to a first aspect of the invention, there is provided an electro-optic apparatus which alternately displays a right eye image and a left eye image in every display period, including: a plurality of pixels which each displays a grayscale based on an applied voltage; and a driving circuit which supplies grayscale potential to each of the plurality of pixels based on the designated grayscale of the right eye image in each of the K (K is a natural number which is equal to or greater than 3) unit periods of each display period of the right eye image, and supplies grayscale potential to each of the plurality of pixels based on the designated grayscale of the left eye image in each of the K unit periods of each display period of the left eye image.

According to the first aspect of the invention, the grayscale potential based on the designated grayscale is supplied to each of the pixels in each of three or more unit periods of each display period, the time ratio of a period of the display period in which the right eye image and the left eye image are mixed (that is, a period during which control is performed such that both the right eye shutter and the left eye shutter are in the closed state) decreases, compared to the technology disclosed in JP-A-2009-25436 in which each display period includes two unit periods U. Accordingly, when it is assumed that the time length (frame rate) of the display period is the same as in the technology disclosed in JP-A-2009-25436, it is possible to set the time, during which the right eye shutter or the left eye shutter are in the open state, of each display period to a long time compared to the technology disclosed in JP-A-2009-25436, and it is possible to improve the brightness of the display image recognized by an observer compared to JP-A-2009-25436.

According to the first aspect of the invention, the driving circuit may perform overdriving in KA (KA is a natural number which is less than K) unit periods from a beginning of the K unit periods of each display period, and may be set such that the polarity of the voltage, which is applied to each of the pixels in the KA unit periods of the display period, is reverse in a right eye image display period of a first control period of a plurality of control periods which each includes a right eye image display period and a left eye image display period and in a right eye image display period of a second control period which is different from the first control period, and in the left eye image display period of the first control period and in a left eye image display period of the second control period. For example, in a configuration in which each display period includes three unit periods (for example, in a first embodiment which will be described later), the driving circuit reverses the polarity of the voltage applied to each of the pixels in units of two unit periods which occur one after another.

According to the first aspect of the invention, overdriving is performed in the KA unit periods from the beginning of each display period, so that it is possible to rapidly update the display image from one of the right eye image and the left eye image to a remaining one. In addition, setting is made such that the polarity of the voltage applied to each of the pixels in the KA unit periods during which the driving circuit performs overdriving is reverse in the right eye image display period of the first control period and in the right eye image display period of the second control period, and reverse in the left eye image display period of the first control period and in the left eye image display period of the second control period. Accordingly, the bias of the polarity of the voltage (the residual of direct current components) applied to each of the pixels is restrained, so that there is an advantage in that it is possible to effectively prevent the deterioration in the characteristic of each of the pixels due to the application of the direct current components.

According to a second aspect of the invention, the driving circuit may perform overdriving in KB (KB is an even number which is less than K) unit periods from the beginning of the K unit periods of each display period, and may be set such that the polarity of the voltage, which is applied to each of the pixels in each display period, is reverse in the half of the unit periods of the KB unit periods of each display period and in a remaining half of the unit periods. According to the second aspect, overdriving is performed in the KB unit periods from the beginning of each display period, so that it is possible to rapidly update the display image from one of the right eye image and the left eye image to a remaining one. In addition, a reverse polarity voltage is applied to each of the pixels in the half of the unit periods of the KB unit periods during which the driving circuit performs overdriving and the remaining half of the unit periods, with the result that the bias of the polarity of the voltage (the residual of direct current components) applied to each of the pixels is restrained, so that there is an advantage in that it is possible to effectively prevent the deterioration in the characteristic of each of the pixels due to the application of the direct current components.

According to the second aspect of the invention, in the configuration in which each display period includes three or four unit periods (for example, a second embodiment and a fourth embodiment which will be described later), the driving circuit reverses the polarity of the voltage which is applied to each of the pixels in units of each unit period. According to the second aspect, the polarity of the voltage applied to each of the pixels is reversed in every unit period, so that there is an advantage in that it is difficult to perceive the variation (flickering) in the display grayscale attributable to the difference in polarities. In addition, according to the second aspect, in the configuration in which the display period includes four unit periods (for example, a third embodiment which will be described later), it may be possible for the driving circuit to set the polarity of the voltage, which is applied to each of the pixels, to a first polarity in the first unit period and the fourth unit period of each display period, and to the second polarity which is reverse to the first polarity in the second unit period and the third unit period of each display period.

According to a preferable aspect of the invention, the electro-optic apparatus, which displays the right eye image and the left eye image which are stereoscopically viewed using stereoscopic eyeglasses including a right eye shutter and a left eye shutter, may further includes an eyeglasses control circuit which performs control such that both the right eye shutter and the left eye shutter are in a closed state in a period which includes at least a part of the first unit period of each display period, which performs control such that the right eye shutter is in an open state and the left eye shutter is in the closed state in a period which includes at least a part of the unit periods after the second unit period of the right eye image display period, and which performs control such that the left eye shutter is in the open state and the right eye shutter is in the closed state in a period which includes at least a part of the unit periods after the second unit period of the left eye image display period.

The electro-optic apparatus according to each of the above-described aspects is used in various types of electronic apparatuses as a display apparatus. For example, a stereoscopic display apparatus, which includes an electro-optic apparatus and the stereoscopic eyeglasses controlled using the eyeglasses control circuit according to each of the above-described aspects, is exemplified as the electronic apparatus according to the aspect of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
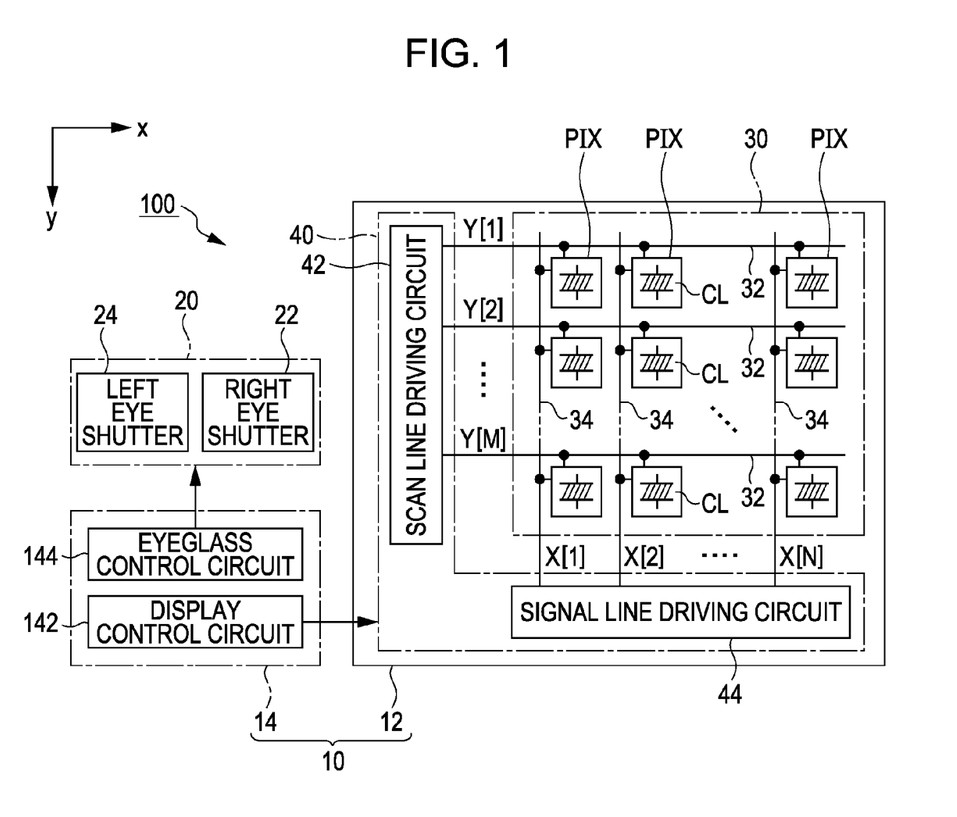
FIG. 1 is a block diagram illustrating a stereoscopic display apparatus according to a first embodiment of the invention.

FIG. 1 is a block diagram illustrating a stereoscopic display apparatus 100 according to a first embodiment of the invention. The stereoscopic display apparatus 100 is an electronic apparatus which displays a stereoscopic image, the stereoscopic effect of which is perceived by an observer, using an active shutter method, and includes an electro-optic apparatus 10 and stereoscopic eyeglasses 20. The electro-optic apparatus 10 alternately displays a right eye image GR and a left eye image GL, to which parallax is mutually applied, in a time division manner.

The stereoscopic eyeglasses 20 are an eyeglass-type apparatus which is worn by an observer when a stereoscopic image displayed using the electro-optic apparatus 10 is viewed, and includes a right eye shutter 22 located in front of the right eye of the observer and a left eye shutter 24 located in front of the left eye. Each of the right eye shutter 22 and the left eye shutter 24 is controlled such that each of the right eye shutter 22 and the left eye shutter 24 is in an open state (transmission state) in which irradiation light is transmitted or in a closed state (light interception state) in which irradiation light is intercepted. For example, a liquid crystal shutter, the state of which varies from one of the open state and the closed state to the other state by varying the orientation direction of liquid crystals based on an applied voltage, may be used for the right eye shutter 22 and the left eye shutter 24.

The electro-optic apparatus 10 shown in FIG. 1 includes an electro-optic panel 12 and a control circuit 14. The electro-optic panel 12 includes a pixel section 30 in which a plurality of pixels (pixel circuits) PIX are arranged, and a driving circuit 40 which drives each of the pixels PIX. The pixel section 30 is formed with M scan lines 32 extended in the x direction and N signal lines 34 extended in the y direction (M and N are natural numbers). The plurality of pixels PIX in the pixel section 30 are arranged in a vertical M row×horizontal N column matrix while corresponding to the respective intersections of the scan lines 32 and the signal lines 34.

Figure 2:
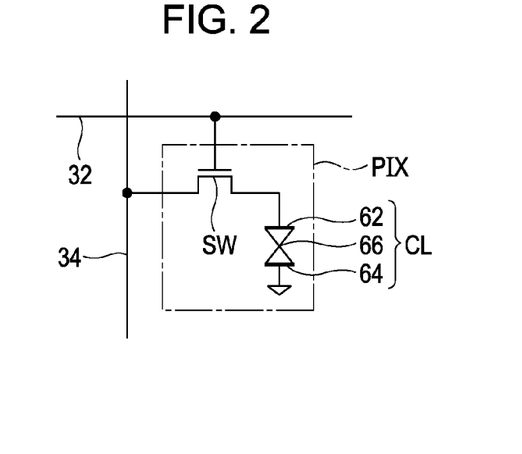
FIG. 2 is a circuit diagram illustrating a pixel circuit.

FIG. 2 is a circuit diagram of each pixel PIX. As shown in FIG. 2, each pixel PIX includes a liquid crystal element CL and a selection switch SW. The liquid crystal element CL is an electro-optic element configured with a pixel electrode 62 and a common electrode 64 which face each other, and liquid crystal 66 interposed between the both electrodes. The transmittance (display grayscale) of the liquid crystal 66 varies based on a voltage applied between the pixel electrode 62 and the common electrode 64. The selection switch SW is configured with an N-channel type thin film transistor, in which a gate is connected to the scan line 32, and is interposed between the liquid crystal element CL and the signal line 34 in order to control the electrical connection (conduction/insulation) therebetween. Accordingly, the pixel PIX (liquid crystal element CL) displays a grayscale based on the electrical potential (a grayscale potential X[n] which will be described later) of the signal line 34, which is obtained when control is performed such that the selection switch SW is turned on. Meanwhile, a configuration in which a subsidiary capacity is connected in parallel to the liquid crystal element CL may be used.

The control circuit 14 shown in FIG. 1 includes a display control circuit 142 which controls the electro-optic panel 12, and an eyeglasses control circuit 144 which controls the stereoscopic eyeglasses 20. In addition, a configuration in which the display control circuit 142 and the eyeglasses control circuit 144 are installed in a stand-alone circuit and a configuration in which the display control circuit 142 and the eyeglasses control circuit 144 are dispersed in separate integrated circuits may be used. The display control circuit 142 controls the driving circuit 40 such that the right eye image GR and the left eye image GL, to which parallax is mutually applied, are displayed on the pixel section 30.

Figure 3:
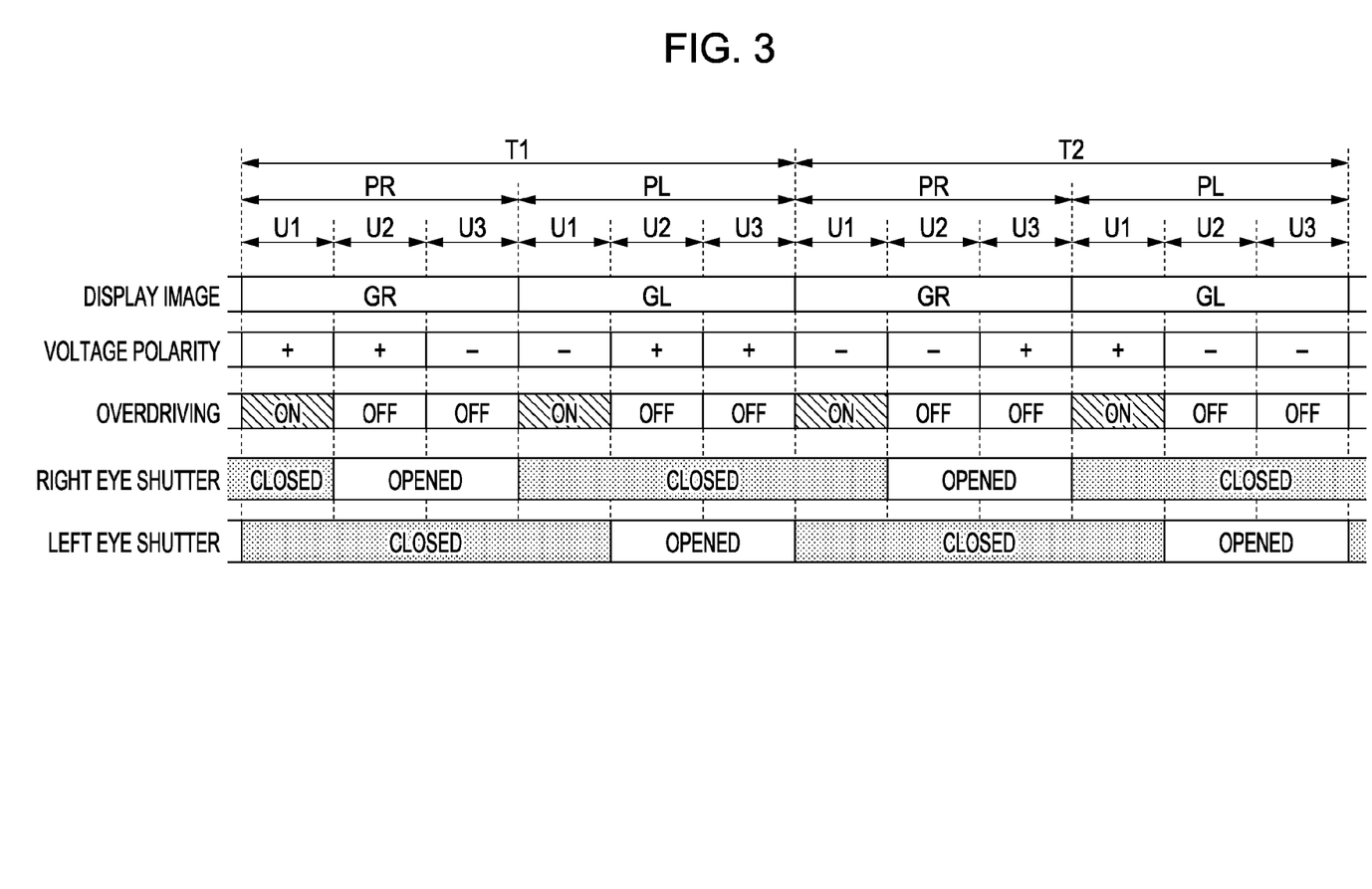
FIG. 3 is an explanatory diagram illustrating an operation according to the first embodiment.

FIG. 3 is an explanatory diagram illustrating the operation of the electro-optic apparatus 10. As shown in FIG. 3, the operating period of the electro-optic apparatus 10 is divided into a plurality of control periods T (T1, T2). The control period T1 and the control period T2 are mutually arranged on a time axis. Each control period T (T1, T2) is divided into two predetermined-length display periods P (a right eye display period PR and a left eye display period PL). The right eye image GR is displayed on the pixel section 30 in the right eye display period PR, and the left eye image GL is displayed on the pixel section 30 in the left eye display period PL. The right eye display period PR and the left eye display period PL are alternately arranged on the time axis. That is, a single control period T is configured with the right eye display period PR and the left eye display period PL which occur one after another. Each display period P (PR, PL) is divided into three unit periods U (U1 to U3) which have time lengths which are equal to each other. The unit period U2 is connected to the unit period U1 and the unit period U3 is connected to the unit period U2.

The driving circuit 40 shown in FIG. 1 is a circuit which supplies a grayscale potential X[n] (n=1 to N) according to a grayscale (hereinafter, refer to "designated grayscale") which is designated to each pixel PIX using an image signal supplied from an external circuit to each pixel PIX, and includes a scan line driving circuit 42 and a signal line driving circuit 44.

The scan line driving circuit 42 sequentially selects each of the M scan lines 32 in such a way as to supply scan signals Y[1] to Y[M] corresponding to the respective scan lines 32. The scan signal Y[m] which is supplied to an m-th row (m=1 to M) scan line 32 is set to a selection potential (potential which means the selection of the scan line 32) in the m-th selection period of the M selection periods (horizontal scan periods) of each unit period U. If the scan signal Y[m] is set to the selection potential in the scan line 32, the selection switches SW of N pixels PIX included in the m-th row are switched on.

The signal line driving circuit 44 shown in FIG. 1 supplies grayscale potentials X[1] to X[N] to respective N signal lines 34 in synchronization with the selection of each scan line 32 using the scan line driving circuit 42. The grayscale potential X[n], which is supplied to the signal line 34 in n-th column in a selection period during which the m-th row scan line 32 is selected from each of the unit periods U of the right eye display period PR, is set to potential which is based on the designated grayscale of the pixel PIX which is located at the m-th row and the n-th column of the right eye image GR. Likewise, in the m-th selection period of each of the unit periods U of the left eye display period PL, the grayscale potential X[n] is set to potential which is based on the designated grayscale of the pixel PIX which is located at the m-th row and the n-th column of the left eye image GR.

That is, in the right eye display period PR, the grayscale potential X[n] based on the right eye image GR is supplied to each pixel PIX for each unit period U, so that the right eye image GR is displayed on the pixel section 30 in each unit period U. In the left eye display period PL, the grayscale potential X[n] based on the left eye image GL is supplied to each pixel PIX for each unit period U, so that the left eye image GL is displayed on the pixel section 30 in each unit period U.

However, in the initial unit period U1 of each display period P, the display image is updated from one of the right eye image GR and the left eye image GL to the other one, so that it is necessary to chiefly change the oriented state of the liquid crystal 66 of the liquid crystal element CL by comparing with the unit period U2 and the unit period U3 in which an image which is equivalent with that of the immediately previous unit period U. Here, the driving circuit 40 (signal line driving circuit 44) according to the first embodiment performs over driving (overvoltage driving) in which an over voltage which surpasses a target voltage based on the designated grayscale is applied to the liquid crystal element CL of each pixel PIX in the unit period U1 of each display period P (PR, PL), FIG. 3. In the unit period U2 and the unit period U3, overdriving is not performed.

In addition, the driving circuit 40 (signal line driving circuit 44) sequentially reverses the polarity of each grayscale potential X[n] with respect to a predetermined reference potential such that the polarity of a voltage applied to the liquid crystal element CL of each pixel PIX is periodically reversed. In the first embodiment, the polarity of the grayscale potential X[n] is reversed in units of two unit periods U which are occur one after another, as shown in FIG. 3. For example, in the control period T1 shown in FIG. 3, the grayscale potential X[n] is set to a positive polarity (+) in the unit period U1 and the unit period U2 of the right eye display period PR, and the grayscale potential X[n] is set to a negative polarity (−) in the unit period U1 of the left eye display period PL which comes immediately after the unit period U3 of the right eye display period PR.

Accordingly, the polarity of the grayscale potential X[n] in the unit period U1 of each display period P, during which overdriving is performed, is a reverse polarity in the right eye display period PR of the control period T1 and in the right eye display period PR with the control period T2. That is, the polarity in the left eye display period PL of the control period T1 is reverse to the polarity in the left eye display period PL of the control period T2. For example, the polarity of the grayscale potential X[n] in the unit period U1 of the right eye display period PR is set to a positive polarity in the control period T1 but set to a negative polarity in the control period T2, and the polarity of the grayscale potential X[n] in the unit period U1 of the left eye display period PL is set to a negative polarity in the control period T1 but set to a positive polarity in the control period T2.

When the grayscale potential X[n] is set to the same polarity in the unit period U1 of the right eye display period PR of each of the control periods T which occur one after another, a bias occurs in the polarity of an overvoltage which is applied to the liquid crystal element CL because of overdriving in the unit period U1 of each right eye display period PR, so that there is a possibility that direct current components may applied to the liquid crystal element CL as a result. In the first embodiment, setting is made such that the polarity of the grayscale potential X[n] in the unit period U1, during which overdriving is performed, of the right eye display period PR is reverse in the control period T1 and the control period T2, so that, for example, the effect of an overvoltage of a positive polarity in the unit period U1 of the right eye display period PR of the control period T1 is offset against the effect of an overvoltage of a negative polarity in the unit period U1 of the right eye display period PR of the control period T2. It is the same as in the left eye display period PL. As described above, according to the first embodiment, the bias (the residual of direct current components) of the polarity of a voltage applied to the liquid crystal element CL is restrained, so that the deterioration in the characteristic of the liquid crystal element CL due to the application of the direct current components is effectively prevented, thereby enabling the reliability of an apparatus to be improved.

The eyeglasses control circuit 144 of the control circuit 14 shown in FIG. 1 controls the states (an open state and a closed state) of the respective right eye shutter 22 and the left eye shutter 24 of the stereoscopic eyeglasses 20 in synchronization with the operation of the electro-optic panel 12. In detail, the eyeglasses control circuit 144 performs control such that both right eye shutter 22 and left eye shutter 24 are in the closed states in the unit period U1 of each display period P, as shown in FIG. 3. In addition, the eyeglasses control circuit 144 performs control such that the right eye shutter 22 is in the open state and the left eye shutter 24 is in the closed state in the unit period U2 and the unit period U3 of the right eye display period PR, and performs control such that the left eye shutter 24 is in the open state and the right eye shutter 22 is in the closed state in the unit period U2 and the unit period U3 of the left eye display period PL.

Accordingly, the right eye image GR which is displayed on the pixel section 30 in the unit period U2 and the unit period U3 of the right eye display period PR is blocked by the left eye shutter 24 while passing through the right eye shutter 22 and reaching the right eye of the observer. Meanwhile, the left eye image GL which is displayed on the pixel section 30 in the unit period U2 and the unit period U3 of the left eye display period PL is blocked by the right eye shutter 22 while passing through the left eye shutter 24 and reaching the left eye of the observer. Since the right eye image GR which passed through the right eye shutter 22 is viewed using right eye and the left eye image GL which passed through the left eye shutter 24 is viewed using left eye, the observer perceives the stereoscopic effect of the display image.

However, in the unit period U1 of the right eye display period PR, the left eye image GL displayed in the immediately previous left eye display period PL (the unit period U3) is sequentially updated to the right eye image GR in units of one row. Further, in the unit period U1 of the left eye display period PL, the right eye image GR displayed in the immediately previous right eye display period PR (the unit period U3) is sequentially updated to the left eye image GL in units of a column. That is, in the unit period U1 of each display period P, the right eye image GR and the left eye image GL are mixed with. As described with reference to FIG. 3, in the first embodiment, in the unit period U1 of each display period P, both the right eye shutter 22 and the left eye shutter 24 are maintained in the closed state, so that the mixture (crosstalk) of the right eye image GR and the left eye image GL is not perceived by the observer. That is, the right eye image GR and the left eye image GL are reliably separated into right eye and left eye, so that it is possible to make the observer to perceive a definite stereoscopic effect.

In the above-described first embodiment, each display period P is configured with three unit periods U1 to U3 and the image (the right eye image GR and the left eye image GL) is displayed in each unit period U. Therefore, compared to the technology disclosed in JP-A-2009-25436 in which each display period P is configured with two unit periods U, the time ratio of the period of the display period P, during which the right eye image GR and the left eye image GL are mixed with (that is, the period during which both the right eye shutter 22 and the left eye shutter 24 should be maintained in the closed state), decreases. Accordingly, if the time length (frame rate) of each display period P is the same as in JP-A-2009-25436, it is possible to make a setting such that the time of the display period P for which the right eye shutter 22 or the left eye shutter 24 is maintained in the open state is longer than that of the technology disclosed in JP-A-2009-25436 in the first embodiment. That is, according to the first embodiment, it is possible to improve the brightness of the display image perceived by the observer, compared to JP-A-2009-25436.

In addition, as the configuration in which setting is made such that the polarity of the grayscale potential X[n] in the unit period U1 of each display period P is reverse in the control period T1 and the control period T2, for example, a configuration can be assumed in which the polarity of the grayscale potential X[n] is reversed in units of a control period T (hereinafter, referred to as "configuration A"). For example, in the configuration A, the grayscale potential X[n] is set to a positive polarity throughout six unit periods U (three unit periods U1 to U3 in the right eye display period PR and three unit periods U1 to U3 in the left eye display period PL) with the control period T1, and the grayscale potential X[n] is set to a negative polarity throughout six unit periods U of the control period T2.

However, even in the case in which the designated grayscale is shared, when the grayscale potential X[n] is set to a positive polarity and when the grayscale potential X[n] is set to a negative polarity, a voltage applied to the liquid crystal element CL (the display grayscale of each pixel PIX) may differ. In the configuration A in which the reverse period of the polarity of the grayscale potential X[n] is long, there is a problem in that it is easy that the observer perceives the variation (that is, flickering) in display grayscale caused by the difference in the polarity of the grayscale potential X[n]. In the first embodiment, the polarity of the grayscale potential X[n] is reversed in units of two unit periods U which occur one after another. That is, the polarity of the voltage applied to the liquid crystal element CL of each pixel PIX is reversed in a period of a time that is shorter than the control period T (for example, 1/60 sec), so that there is an advantage in that it is difficult for the observer to perceive flickering caused by the difference in the polarity of the grayscale potential X[n], compared to the configuration A.

Figure 4:
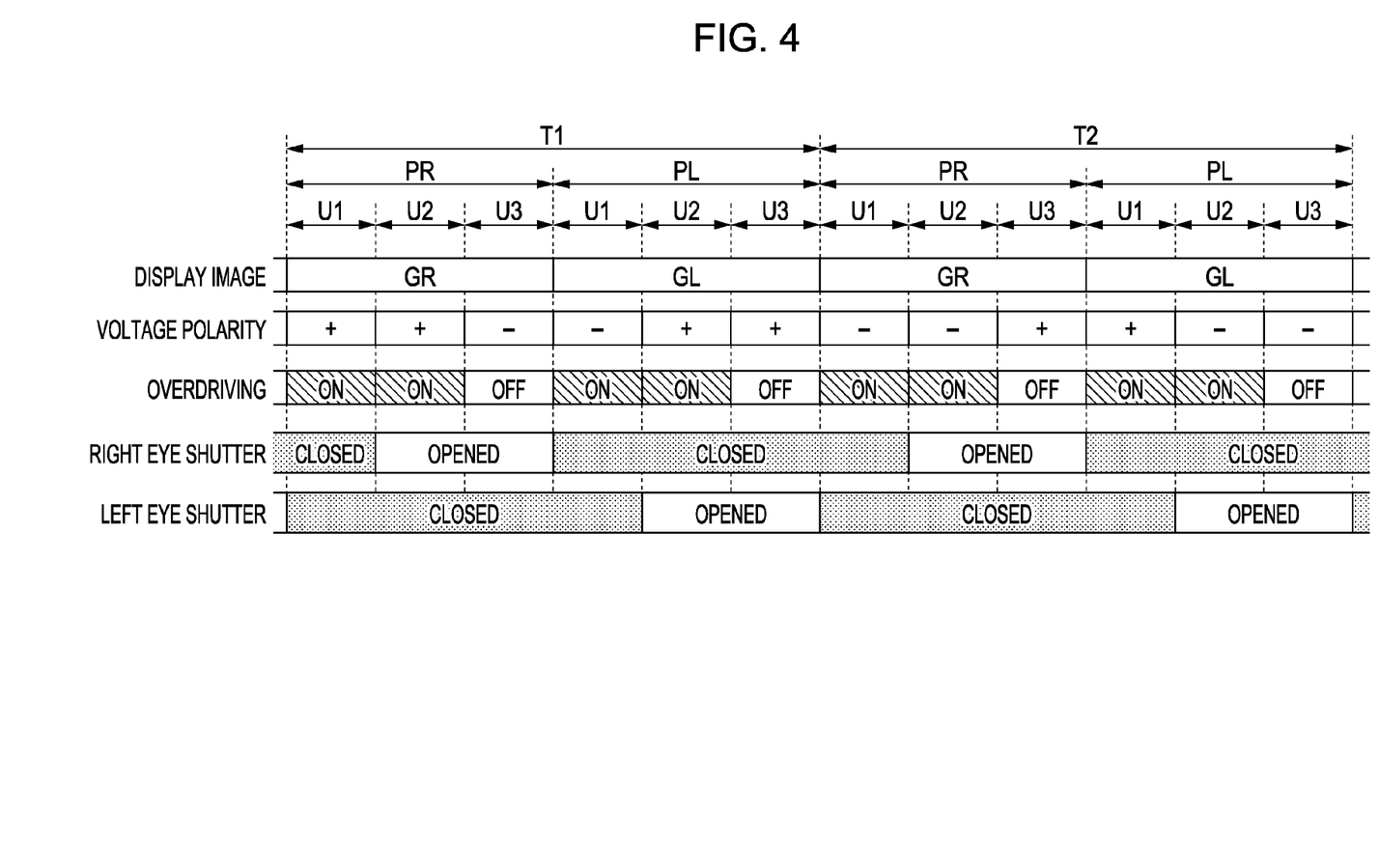
FIG. 4 is an explanatory diagram illustrating an operation according to a modification example of the first embodiment.

In addition, although overdriving is performed in a single unit period U1 of each display period P in the first embodiment, a configuration in which overdriving is performed throughout two or more unit periods from the beginning of the plurality of unit periods U of the display period P can be used. For example, as shown in FIG. 4, it is possible to perform overdriving in the unit period U1 and the unit period U2 of each display period P. Even in the form shown in FIG. 4, setting is made such that the polarity of the grayscale potential X[n] (the voltage applied to each pixel PIX) in the unit period U1 and the unit period U2 in which the driving circuit 40 performs overdriving is reverse to the polarity in the right eye display period PR of the control period T1 and the right eye display period PR of the control period T2, and is reverse to the polarity in the left eye display period PL of the control period T1 and the left eye display period PL of the control period T2.

The number of unit periods U2 included in each display period P and the number of unit periods U of each display period P during which overdriving is performed are appropriately varied. When a case is assumed in which each display period P includes K (K is a natural number which is equal to or greater than 3) unit periods U and in which overdriving is performed throughout KA (KA is a natural number which is less than K) unit periods from the beginning of the K unit periods U of each display period P, the driving circuit 40 is included as an element which makes setting such that the polarity of the voltage applied to each pixel PIX in the KA unit periods of each display period P is reverse in the right eye display period PR of the control period T1 and the right eye display period PR of the control period T2, and makes a setting such that the polarity of the voltage is reverse in the left eye display period PL of the control period T1 and the left eye display period PL of the control period T2. The first embodiment shown in FIG. 3 has a configuration in which the number K is set to 3 and the number KA is set to 1, and the embodiment shown in FIG. 4 has a configuration in which the number K is set to 3 and the number KA is set to 2. As described above, according to the configuration in which overdriving is performed, it is possible to effectively prevent the mixture (crosstalk) of the right eye image GR and the left eye image GL.

Second Embodiment

A second embodiment of the invention will be described below. In addition, with respect to components which have equivalent operations or functions to those of the first embodiment in each configuration which will be illustrated below, reference numerals referred in the above description are used and the detailed description thereof will be appropriately omitted.

Figure 5:
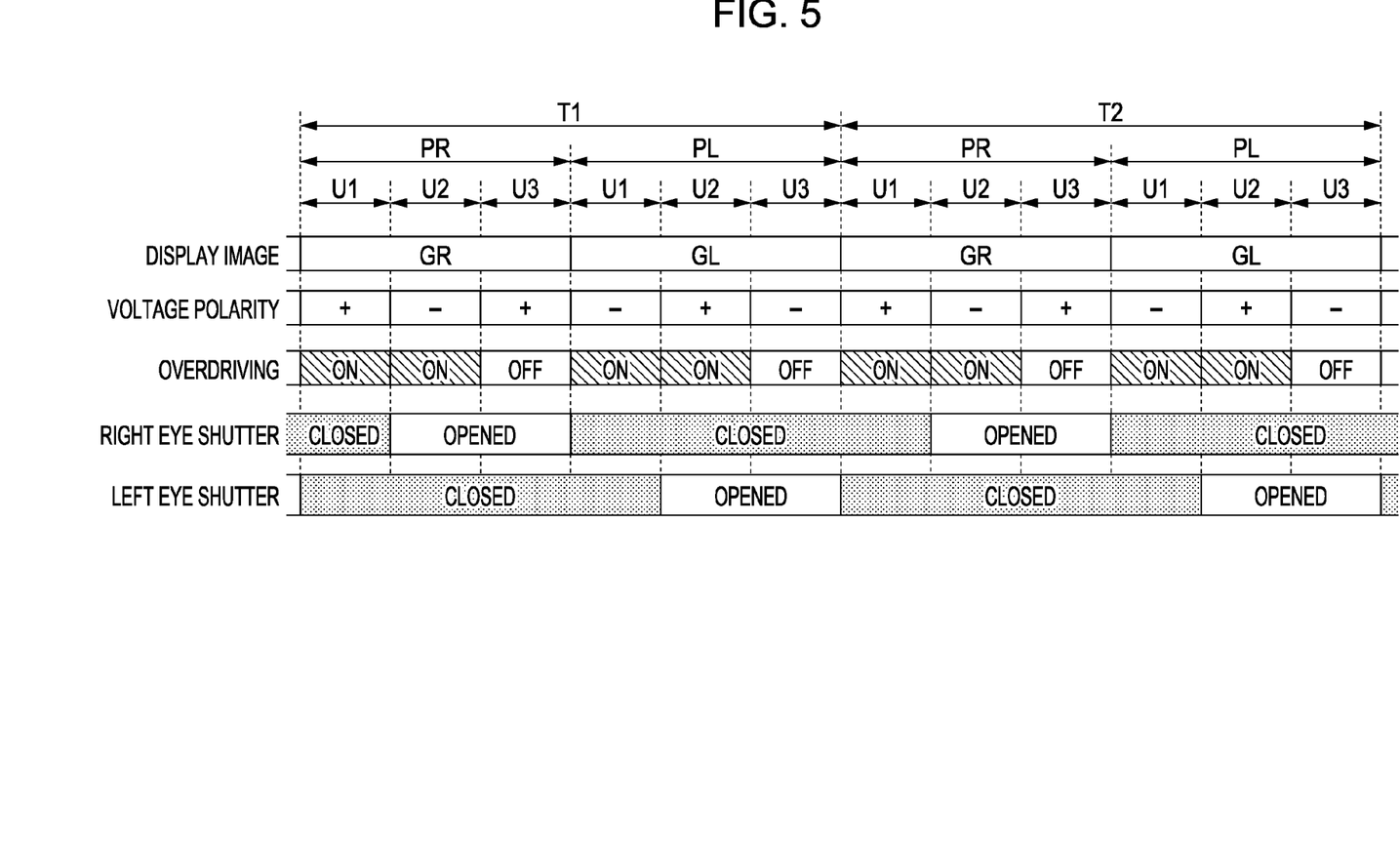
FIG. 5 is an explanatory diagram illustrating an operation according to a second embodiment.

FIG. 5 is an explanatory diagram illustrating an operation according to the second embodiment. As shown in FIG. 5, the driving circuit 40 according to the second embodiment supplies a grayscale potential X[n] based on a designated grayscale to each pixel PIX in each of the three unit periods U1 to U3 of each display period P (PR, PL). Accordingly, like the first embodiment, the time ratio of a period, during which the right eye image GR and the left eye image GL are mixed, of the display period P decreases, so that the brightness of the display image perceived by the observer is improved, compared to JP-A-2009-25436. Like the configuration shown in FIG. 4, the driving circuit 40 according to the second embodiment performs overdriving in two unit periods, that is, the unit period U1 and the unit period U2, from the beginning of the three unit periods U1 to U3 of each display period P. In addition, an operation of opening and closing the right eye shutter 22 and the left eye shutter 24 is the same as in the first embodiment.

In addition, the driving circuit 40 sequentially reverses the polarity of the grayscale potential X[n] at every single unit period U. In detail, the driving circuit 40 sets the grayscale potential X[n] to a positive polarity in the unit period U1 and the unit period U3 of the right eye display period PR and the unit period U2 of the left eye display period PL, and sets the grayscale potential X[n] to a negative polarity in the unit period U2 of the right eye display period PR and the unit period U1 and the unit period U3 of the left eye display period PL. Accordingly, as shown in FIG. 5, in the unit period U1 and the unit period U2 of each display period P, during which overdriving is performed, a reverse polarity voltage is applied to the liquid crystal element CL of each pixel PIX.

In the second embodiment, in the unit period U1 and the unit period U2 of each display period P, during which overdriving is performed, the grayscale potential X[n] is set to a reverse polarity. Therefore, for example, the effect of the overvoltage of a positive polarity in the unit period U1 of the right eye display period PR is offset against the effect of the overvoltage of a negative polarity in the unit period U2 which is immediately after the unit period U1. Accordingly, in the second embodiment, there is an advantage in that the bias of the polarity of a voltage to be applied to the liquid crystal element CL is restrained, thereby preventing the deterioration in the characteristic of the liquid crystal element CL due to the application of direct current components.

Third Embodiment

Figure 6:
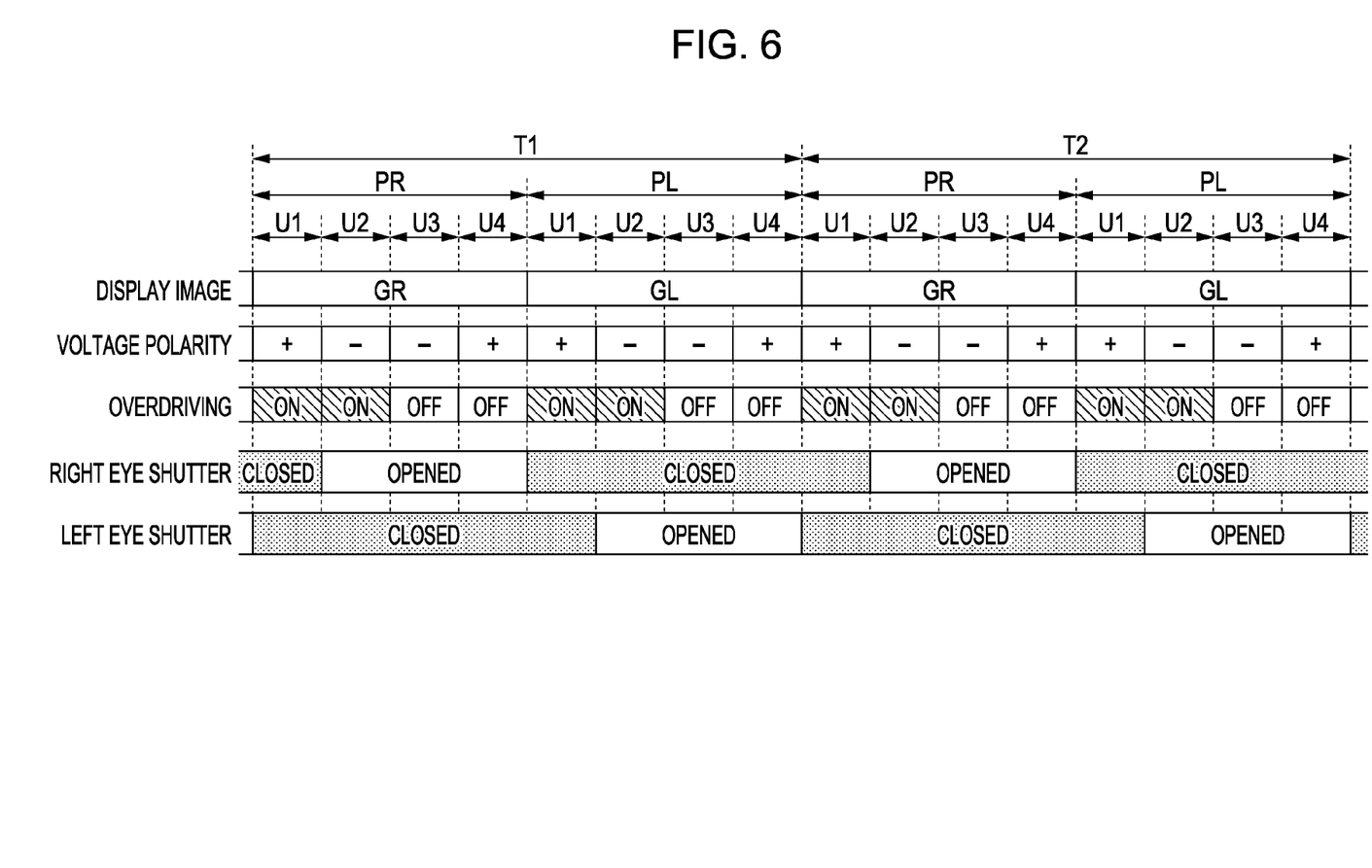
FIG. 6 is an explanatory diagram illustrating an operation according to a third embodiment.

FIG. 6 is an explanatory diagram illustrating an operation according to the third embodiment. As shown in FIG. 6, each display period P (PR, PL) is divided into four unit periods U1 to U4 which have time lengths which are equal to each other. The driving circuit 40 supplies the grayscale potential X[n] to each pixel PIX based on the designated grayscale of each pixel PIX in each of the four unit periods U1 to U4. Accordingly, like the first embodiment, the time ratio of a period, during which the right eye image GR and the left eye image GL are mixed, of the display period P decreases, so that the brightness of the display image perceived by the observer is improved, compared to JP-A-2009-25436.

In the initial unit period U1 of each display period P, control is performed such that both the right eye shutter 22 and the left eye shutter 24 are in the closed state. In unit period U (U2 to U4) from the unit period U2 of the right eye display period PR, control is performed such that the right eye shutter 22 is in the open state and the left eye shutter 24 is in the closed state. In the unit period U (U2 to U4) from the unit period U2 of the left eye display period PL, control is performed such that the left eye shutter 24 is in the open state and the right eye shutter 22 is in the closed state.

As shown in FIG. 6, the driving circuit 40 performs overdriving in two unit periods, that is, the unit period U1 and the unit period U2 from the beginning of the four unit periods U1 to U4 of each display period P. In addition, the driving circuit 40 sequentially reverses the polarity of the grayscale potential X[n] in units of two unit periods U which occur one after another. In detail, the driving circuit 40 reverses the polarity of the grayscale potential X[n] while using the border between the unit period U1 and the unit period U2 of each display period P and the border between the unit period U3 and the unit period U4 of each display period P as the border of the reverse of a polarity. That is, the grayscale potential X[n] is set to a positive polarity in the unit period U1 and the unit period U4 of each display period P (PR, PL), and the grayscale potential X[n] is set to a negative polarity in the unit period U2 and the unit period U3 of each display period P.

As described above, in the third embodiment, voltages having polarities which are reverse to each other are applied to the liquid crystal element CL of each pixel PIX in the unit period U1 and the unit period U2, during which overdriving is performed, of each display period P. Accordingly, like the second embodiment, the effect of the overvoltage of the positive polarity in the unit period U1 of each display period P is offset against the effect of the overvoltage of the negative polarity in the unit period U2 which is immediately after the unit period U1. It is the same as in the left eye display period PL, so that it is possible to prevent the deterioration in the characteristic of the liquid crystal element CL due to the application of direct current components.

In addition, in the third embodiment, in the display period P, the time length (unit period U1, unit period U4) in which the grayscale potential X[n] is set to a positive polarity is equal to the time length (unit period U2, unit period U3) in which the grayscale potential X[n] is set to a negative polarity. Accordingly, when compared to a configuration (for example, the second embodiment) in which the time length of the positive polarity of the grayscale potential X[n] is different from the time length of the negative polarity in each display period P, there is an advantage in that it is possible to effectively restrain the bias of the polarity of a voltage which is supplied to the liquid crystal element CL.

In the third embodiment, each display period P includes four unit periods U1 to U4 and the polarity of the grayscale potential X[n] is reversed in units of two unit periods U. That is, when compared to the first embodiment in which each display period P includes three unit periods U1 to U3 and the polarity of the grayscale potential X[n] is reversed in units of two unit periods U, the polarity of the grayscale potential X[n] is reversed in a short period. Accordingly, there is an advantage in that it is difficult for the observer to perceive flickering caused by the difference in the polarity of the grayscale potential X[n].

Fourth Embodiment

Figure 7:
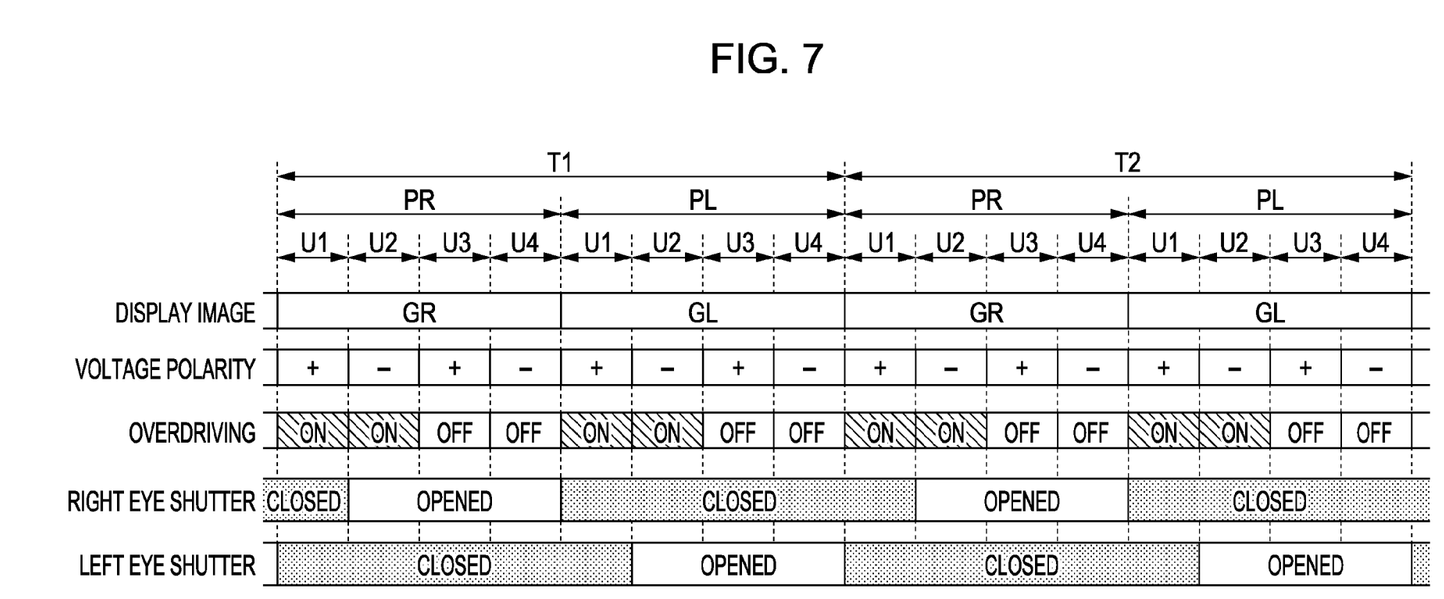
FIG. 7 is an explanatory diagram illustrating an operation according to a fourth embodiment.

FIG. 7 is an explanatory diagram illustrating an operation according to a fourth embodiment. In the fourth embodiment, each display period P (PR, PL) includes four unit periods U1 to U4, and the driving circuit 40 performs overdriving in the unit period U1 and the unit period U2 of each display period, like the third embodiment. An operation of opening and closing the right eye shutter 22 and the left eye shutter 24 is the same as in the third embodiment.

The driving circuit 40 sequentially reverses the polarity of the grayscale potential X[n] at every single unit period U. In detail, the grayscale potential X[n] is set to a positive polarity in the unit period U1 and the unit period U3 of each display period P, and the grayscale potential X[n] is set to a negative polarity in the unit period U2 and the unit period U4 of each display period P. Accordingly, like the third embodiment, voltages the polarities of which are reverse to each other are applied to the liquid crystal element CL of each pixel PIX in the unit period U1 and the unit period U2, during which overdriving is performed, of each display period P.

Accordingly, the same effect as in the third embodiment is implemented in the fourth embodiment. In addition, in the fourth embodiment, the polarity of the grayscale potential X[n] is reversed at every unit period U. That is, compared to the third embodiment in which the polarity of the grayscale potential X[n] is reversed in units of two unit periods U which occur one after another, the polarity of the grayscale potential X[n] is reversed in a short period. Accordingly, there is an advantage in that it is difficult to perceive flickering caused by the difference in the polarity of the grayscale potential X[n], compared to the third embodiment.

In addition, from the second embodiment to the fourth embodiment, the number of unit periods U of each display period P and the number of unit periods U, during which overdriving is performed, of each display period P are appropriately varied. That is, the configurations of the second embodiment to the fourth embodiment are included as a configuration in which overdriving is performed in KB (KB is an even number which is lower than K) unit periods U from the beginning of the K unit periods U of each display period P, and in which setting is made such that the polarity of a voltage applied to each pixel PIX in each display period P is reverse in the half (KB/2) unit periods of the KB unit periods U from the beginning of each display period P and a remaining half (KB/2) unit periods U. According to the above-described configuration, the effect of the overvoltage of the positive polarities in the half of the unit periods U of KB unit periods of each display period P is offset against the effect of the overvoltage of the negative polarities in the remaining half unit periods U, so that the application direction current components to the liquid crystal element CL is restrained. The above-described second embodiment has a configuration in which the number K is set to 3 and the number KB is set to 2, and the third embodiment and the fourth embodiment have a configuration in which the number K is set to 4 and the number KB is set to 2.

Modification Example

The above-described embodiments may be modified in various forms. Detailed modified embodiments will be exemplified below. Two or more embodiments randomly selected from the exemplifications below may be appropriately combined in the range in which they do not contradict from each other.

In each of the above-described embodiments, the right eye shutter 22 is changed from the closed state to the open state at the end point of the unit period U1 of the right eye display period PR. However, the period of changing the right eye shutter 22 from the closed state to the open state may be appropriately changed. For example, in a configuration in which the right eye shutter 22 is changed to the open state before the end point of the unit period U1 of the right eye display period PR, the mixture of the right eye image Gr and the left eye image GL in the unit period U1 is slightly perceived by an observer. However, it is possible to improve the brightness of the display image. Meanwhile, in a configuration in which the right eye shutter 22 is changed to the open state at the time point after the end point of the unit period U1 of the right eye display period PR, the brightness of the display image is lowered. However, it is possible to reliably prevent an observer from perceiving the mixture of the right eye image GR and the left eye image GL. Likewise, configurations may be used in which setting is made such that the period of changing the right eye shutter 22 from the open state to the closed state is previous to the end point of the right eye display period PR (although the brightness of the display image is lowered, the mixture of the right eye image GR and the left eye image GL is prevented), and in which setting is made such that the period of changing the right eye shutter 22 from the open state to the closed state is after the end point of the right eye display period PR (although the mixture of the right eye image GR and the left eye image GL is slightly perceived in the unit period U1 of the left eye display period PL, the brightness of the display image is improved). In addition, the opening and closing period, during which it is difficult for an observer to perceive the mixture of the right eye image GR and the left eye image GL, depends on the relationship between the response characteristic of the right eye shutter 22 and the left eye shutter 24 and the response characteristic of the electro-optic panel 12 (liquid crystal element CL). Accordingly, the period of changing the right eye shutter 22 from the closed state to the open state and the period of changing the right eye shutter 22 from the open state to the closed state are selected in consideration of various types of causes, such as the priority (balance) of the prevention of perception of the mixture of the right eye image GR and the left eye image GL performed by an observer and the reliability of the brightness of the display image, and the relationship between the response characteristic of the stereoscopic eyeglasses 20 and the response characteristic of the electro-optic panel 12. In addition, although the right eye shutter 22 has been mentioned in the above description, the same circumstance is applied to the period of opening and closing the left eye shutter 24.

As understood from the above description, the period during which control is performed such that the right eye shutter 22 is in the open state is included as a period in which at least a part of the period after the unit period U2 of the right eye display period PR is included (regardless whether a part of the unit period U1 is included or not). Likewise, the period during which control is performed such that the left eye shutter 24 is in the open state is included as a period in which at least a part of the period after the unit period U2 of the left eye display period PL is included (regardless whether a part of the unit period U1 is included or not). In addition, the period in which control is performed such that both the right eye shutter 22 and the left eye shutter 24 are in the closed state is included as a period in which at least a part of the unit period U1 of each display period P (PR, PL) is included (regardless whether a part of the period after the unit period U2 is included or not).

The electro-optic element is not limited to the liquid crystal element CL. For example, an electrophoretic element can be used as the electro-optic element. That is, the electric potential optical element is included as a display element in which the optical characteristic (for example, transmittance) thereof varies according to an electrical operation (for example, application of a voltage).

Application Example

Figure 8:
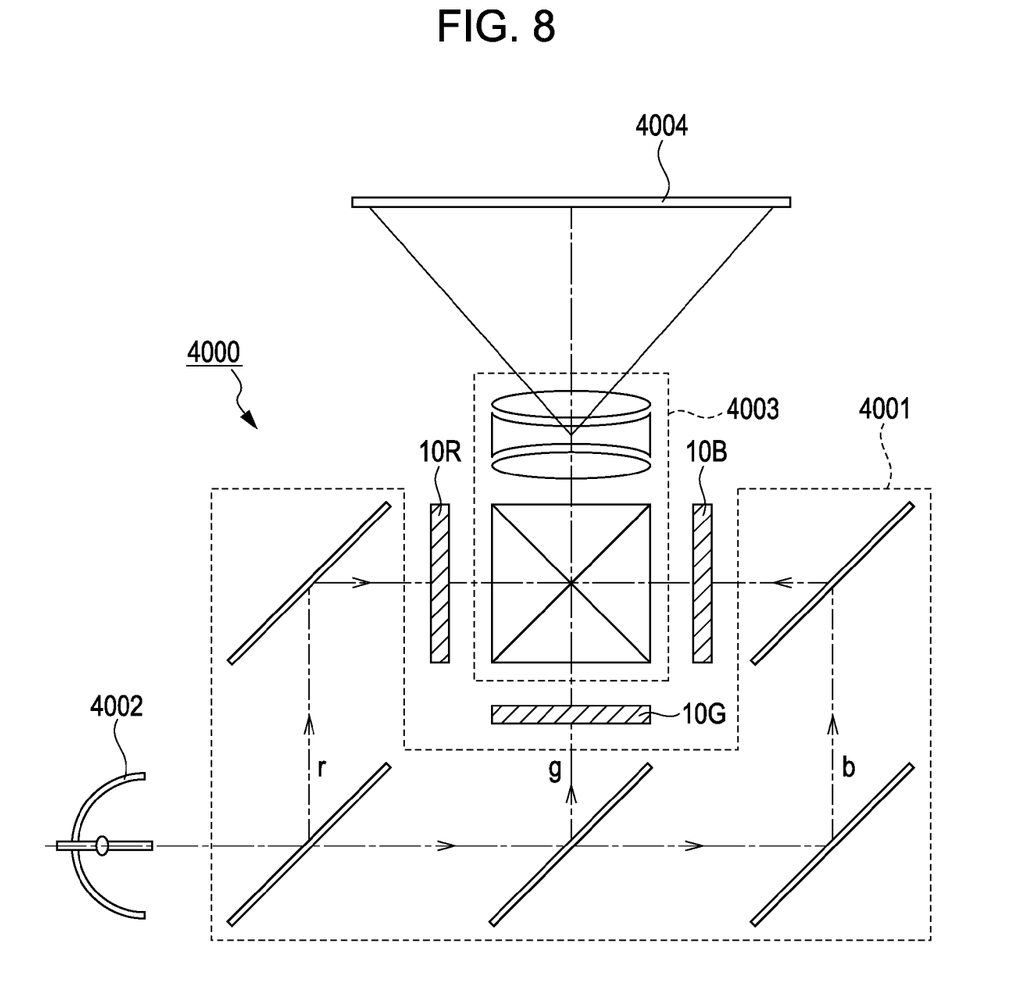
FIG. 8 is a perspective view illustrating an electronic apparatus (projection-type display apparatus).
Figure 9:
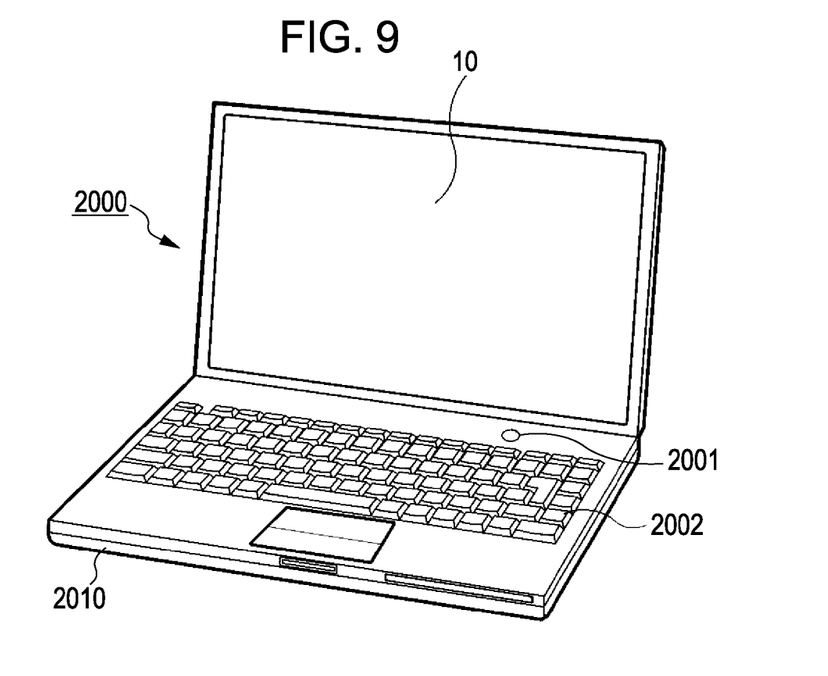
FIG. 9 is a perspective view illustrating an electronic apparatus (personal computer).
Figure 10:
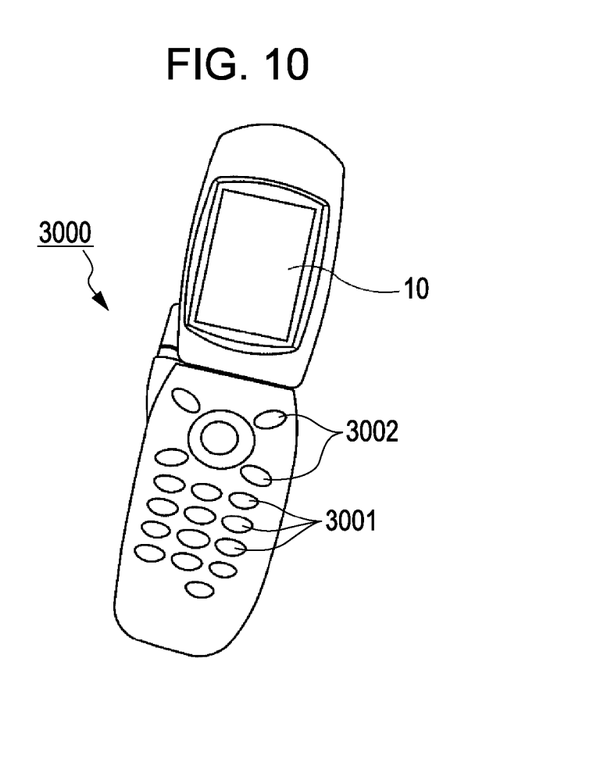
FIG. 10 is a perspective view illustrating an electronic apparatus (mobile phone).

The electro-optic apparatus 10 illustrated in each of the above embodiments may be used as various types of electronic apparatuses. In FIGS. 8 to 10, the detailed form of an electronic apparatus which uses the electro-optic apparatus 10 is illustrated.

FIG. 8 is a perspective view illustrating a projection-type display apparatus (three panel projector) 4000 to which the electro-optic apparatus 10 is applied. The projection-type display apparatus 4000 includes three electro-optic devices 10 (10R, 10G, and 10B) corresponding to different display colors (red, green, and blue). An illuminating optical system 4001 supplies the red color component r of light emitted from the illumination apparatus (light source) 4002 to the electro-optic apparatus 10R, supplies the green component g to the electro-optic apparatus 10G, and supplies the blue component b to the electro-optic apparatus 10B. Each electro-optic apparatus 10 functions as a light modulator (light valve) which modulates monochromatic light, supplied from the illuminating optical system 4001, according to the display image. The optical projection system 4003 synthesizes light emitted from each electro-optic apparatus 10 and projects the resulting light upon a projection surface 4004. An observer views a stereoscopic image projected upon the projection surface 4004 using stereoscopic eyeglasses 20 (not shown in FIG. 8).

FIG. 9 is a perspective view illustrating a portable personal computer which uses the electro-optic apparatus 10. A personal computer 2000 includes an electro-optic device 10 which displays various types of images and a main body section 2010 provided with a power switch 2001 and a keyboard 2002.

FIG. 10 is a perspective view illustrating a mobile phone to which the electro-optic apparatus 10 is applied. A mobile phone 3000 includes a plurality of operational buttons 3001 and scroll buttons 3002, and an electro-optic apparatus 10 which displays various types of images. When the scroll buttons 3002 are operated, an image displayed on the electro-optic apparatus 10 is scrolled.

Further, in addition to the apparatuses illustrated in FIGS. 8 to 10, a Personal Digital Assistant (PDA), a digital still camera, a television, a video camera, a car navigation apparatus, a vehicle display apparatus (an instrument panel), an electronic organizer, electronic paper, an electronic calculator, a word processor, a workstation, a video phone, a Point-of-Sale (POS) terminal, a printer, a scanner, a copy machine, a video player, or an apparatus having a touch panel may be used as an electronic apparatus to which the electro-optic apparatus according to the invention is applied.

This application claims priority to Japan Patent Application No. 2011-183467 filed Aug. 25, 2011, the entire disclosures of which are hereby incorporated by reference in their entireties.

What is claimed is:

1. An electro-optic apparatus which alternately displays a right eye image and a left eye image, comprising:
a plurality of pixels which each displays a grayscale based on an applied voltage; and
a driving circuit which supplies grayscale potential to each of the plurality of pixels based on a designated grayscale of the right eye image in each of K (K is a natural number which is equal to or greater than 3) unit periods of an display period of the right eye image, and supplies grayscale potential to each of the plurality of pixels based on a designated grayscale of the left eye image in each of K unit periods of an display period of the left eye image,
wherein the driving circuit performs overdriving in KA (KA is a natural number which is less than K) unit period from a beginning of the K unit periods of the display period of the right eye image and performs overdriving in KA unit periods from a beginning of the K unit periods of the display period of the left eye image, and
wherein the driving circuit does not perform overdriving in a last unit period of the K unit periods regardless of the greyscale potential supplied during the last unit period.

2. The electro-optic apparatus according to claim 1,
wherein the driving circuit sets a polarity of the voltage which is applied to each of the pixels, and reverses the polarity of the voltage in the KA unit period of the display period of the right eye image of a first control period of a plurality of control periods, which each includes the display period of the right eye image and the display period of the left eye image, and the polarity of the voltage in the KA unit period of the display period of the right eye image of a second control period which is different from the first control period.

3. The electro-optic apparatus according to claim 2,
wherein the driving circuit reverses the polarity of the voltage in the KA unit period of the display period of the left eye image of the first control period and the polarity of the voltage in the KA unit period of the display period of the left eye image of the second control period.

4. An electro-optic apparatus which alternately displays a right eye image and a left eye image, comprising:
a plurality of pixels which each displays a grayscale based on an applied voltage; and
a driving circuit which supplies grayscale potential to each of the plurality of pixels based on a designated grayscale of the right eye image in each of K (K is a natural number which is equal to or greater than 3) unit periods of an display period of the right eye image, and supplies grayscale potential to each of the plurality of pixels based on a designated grayscale of the left eye image in each of K unit periods of an display period of the left eye image, wherein the driving circuit performs overdriving in KA (KA is a natural number which is less than K) unit period from a beginning of the K unit periods of the display period of the right eye image and performs overdriving in KA unit periods from a beginning of the K unit periods of the display period of the left eye image, wherein the driving circuit sets a polarity of the voltage which is applied to each of the pixels, and reverses the polarity of the voltage in the KA unit period of the display period of the right eye image of a first control period of a plurality of control periods, which each includes the display period of the right eye image and the display period of the left eye image, and the polarity of the voltage in the KA unit period of the display period of the right eye image of a second control period which is different from the first control period, wherein the display period includes three unit periods, and wherein the driving circuit reverses the polarity of the voltage every two unit periods.

5. An electro-optic apparatus which alternately displays a right eye image and a left eye image, comprising:

a plurality of pixels which each displays a grayscale based on an applied voltage; and a driving circuit which supplies grayscale potential to each of the plurality of pixels based on a designated grayscale of the right eye image in each of K (K is a natural number which is equal to or greater than 3) unit periods of an display period of the right eye image, and supplies grayscale potential to each of the plurality of pixels based on a designated grayscale of the left eye image in each of K unit periods of an display period of the left eye image, wherein the driving circuit performs overdriving in KB (KB is an even number which is less than K) unit period from a beginning of the K unit periods of the display period of the right eye image and performs overdriving in KB unit periods from a beginning of the K unit periods of the display period of the left eye image, and wherein the driving circuit does not perform overdriving in a last unit period of the K unit periods regardless of the greyscale potential supplied during the last unit period.

6. The electro-optic apparatus according to claim 5, wherein the driving circuit sets a polarity of the voltage, which is applied to each of the pixels, and reverses the polarity of the voltage in the KB unit period of the display period of the right eye image of a first control period of a plurality of control periods, which each includes the display period of the right eye image and the display period of the left eye image, and the polarity of the voltage in the KB unit period of the display period of the right eye image of a second control period which is different from the first control period.

7. The electro-optic apparatus according to claim 5, wherein the display period includes three or four unit periods, and wherein the driving circuit sets a polarity of the voltage, which is applied to each of the pixels, and reverses the polarity of the voltage every one unit period.

8. The electro-optic apparatus according to claim 5, wherein the display period includes four unit periods, and wherein the driving circuit sets a polarity of the voltage, which is applied to each of the pixels, to a first polarity in a first unit period and a fourth unit period of the display period, and to a second polarity which is reverse to the first polarity in a second unit period and a third unit period of the display period.

9. The electro-optic apparatus, which displays the right eye image and the left eye image which are stereoscopically viewed using stereoscopic eyeglasses including a right eye shutter and a left eye shutter, according to claim 1, further comprising:

an eyeglasses control circuit which performs control such that both the right eye shutter and the left eye shutter are in a closed state in a period which includes at least a part of a first unit period of the unit periods, which performs control such that the right eye shutter is in an open state and the left eye shutter is in the closed state in a period which includes at least a part of a second unit period of the unit periods of the display period of the right eye image, and which performs control such that the left eye shutter is in the open state and the right eye shutter is in the closed state in a period which includes at least a part of a second unit period of the unit periods of the display period of the left eye image.

10. An electronic apparatus comprising the electro-optic apparatus according to claim 1.

* * * * *